United States Patent
Wecking et al.

(10) Patent No.: US 11,391,280 B2
(45) Date of Patent: Jul. 19, 2022

(54) DISMOUNTING DEVICE FOR PROGRESSIVE CAVITY PUMPS

(71) Applicant: CIRCOR PUMPS NORTH AMERICA, LLC., Monroe, NC (US)

(72) Inventors: Patrick Wecking, Borken (DE); Berthold Rottmann, Bottrop (DE); Simon Malburg, Borken (DE); Thomas Reitz, Bodman-Ludwigshafen (DE)

(73) Assignee: CIRCOR PUMPS NORTH AMERICA, LLC., Monroe, NC (US)

( * ) Notice: Subject to any disclaimer, the term of this patent is extended or adjusted under 35 U.S.C. 154(b) by 179 days.

(21) Appl. No.: 16/756,006

(22) PCT Filed: Oct. 24, 2017

(86) PCT No.: PCT/US2017/058004
§ 371 (c)(1),
(2) Date: Apr. 14, 2020

(87) PCT Pub. No.: WO2019/078903
PCT Pub. Date: Apr. 25, 2019

(65) Prior Publication Data
US 2020/0256334 A1    Aug. 13, 2020

(30) Foreign Application Priority Data
Oct. 20, 2017    (EP) ...................................... 17197656

(51) Int. Cl.
*F04C 2/107* (2006.01)
*F04C 13/00* (2006.01)
*F16D 1/08* (2006.01)

(52) U.S. Cl.
CPC .......... *F04C 2/1071* (2013.01); *F04C 13/008* (2013.01); *F16D 1/0847* (2013.01);
(Continued)

(58) Field of Classification Search
CPC .. F04C 2/1071; F04C 13/008; F04C 2230/60; F04C 2230/70; F04C 2230/80;
(Continued)

(56) References Cited

U.S. PATENT DOCUMENTS 5,603,608 A    2/1997    Marz
5,688,114 A *  11/1997   Millington ............ F04C 2/1071
                                                        418/182
(Continued)

FOREIGN PATENT DOCUMENTS

DE    20011301 U1    10/2000
EP    2944819 A1    11/2015
(Continued)

OTHER PUBLICATIONS

International Search report and Written Opinion dated Jan. 8, 2018 for PCT/US2017/058004 filed Oct. 24, 2017, 7 pages.
(Continued)

*Primary Examiner* — Dominick L Plakkoottam
*Assistant Examiner* — Paul W Thiede
(74) *Attorney, Agent, or Firm* — KDB Firm PLLC

(57) ABSTRACT

A pump includes a housing having a first end and a second end and extending along a longitudinal axis and a discharge casing having a first end coupleable to the second end of the housing. The discharge casing extends along the longitudinal axis coaxial to the housing. A dismounting device includes a first dismount casing and a second dismount casing disposed between the discharge casing and the second end of the housing. The dismounting device extends along the longitudinal axis coaxial to the housing and the discharge casing.

13 Claims, 7 Drawing Sheets

(52) U.S. Cl.
CPC ...... *F04C 2230/60* (2013.01); *F04C 2230/70* (2013.01); *F04C 2230/80* (2013.01); *F04C 2240/10* (2013.01); *F04C 2240/20* (2013.01); *F04C 2240/30* (2013.01); *F04C 2240/60* (2013.01)

(58) Field of Classification Search
CPC .............. F04C 2240/10; F04C 2240/20; F04C 2240/30; F04C 2240/60; F16D 1/0847
See application file for complete search history.

(56) References Cited

U.S. PATENT DOCUMENTS

| | | | | |
|---|---|---|---|---|
| 6,227,829 | B1* | 5/2001 | Wehling | F04C 2/1071 403/368 |
| 7,473,082 | B2* | 1/2009 | Marielle | F01C 17/06 403/362 |
| 2003/0196802 | A1 | 10/2003 | Proctor | |
| 2010/0239446 | A1 | 9/2010 | Ree | |
| 2012/0063941 | A1 | 3/2012 | Overmeier et al. | |
| 2014/0271300 | A1* | 9/2014 | Purcell | F04C 2/1071 418/48 |
| 2015/0322946 | A1* | 11/2015 | Krampe | F16D 3/387 418/182 |
| 2016/0084085 | A1* | 3/2016 | Eisner | F01C 1/101 418/48 |
| 2016/0341196 | A1* | 11/2016 | Tanaka | F04C 15/0015 |
| 2017/0268505 | A1* | 9/2017 | Dicks | F04C 18/107 |

FOREIGN PATENT DOCUMENTS

| | | |
|---|---|---|
| JP | 2000345970 A | 12/2000 |
| WO | 2009024279 A1 | 2/2009 |

OTHER PUBLICATIONS

EP Extended Search Report dated Mar. 20, 2018 for EP17197656 filed Oct. 20, 2018, 7 pages.

* cited by examiner

DISMOUNTING DEVICE FOR PROGRESSIVE CAVITY PUMPS

This is a national stage application filed under 35 U.S.C. § 371 of pending international application PCT/US2017/058004, filed Oct. 24, 2017, which claims priority to European Patent application EP 17197656, filed Oct. 20, 2017, the entirety of which applications are hereby incorporated by reference herein.

FIELD OF THE DISCLOSURE

The disclosure generally relates to pumps, and more particularly to a dismounting device for progressive cavity pumps to allow for easier pump maintenance and repair.

BACKGROUND OF THE DISCLOSURE

Progressive cavity (PC) pumps may be typically used for handling fluids in a variety of applications including but not limited to waste water, waste water treatment, chemical and petrochemical, paper and cellulose, soap and fats, paint and lacquer, food and beverage, plastics, ceramics, agriculture, sugar, and shipbuilding industries. Typical PC pumps may handle many types of fluids from liquid to highly viscous, neutral to corrosive, and contaminated or uncontaminated. Progressive cavity pumps may also typically handle fluids having solid matter, and fluids including a combination of liquid and gases.

Repair and maintenance of these PC pumps require extensive disassembly to access internal components, such as seals, rotors, stators, and the like. In many cases the pump is required to be removed from the piping system and repaired in a workshop. As will be appreciated, such repair operations can result in long system downtimes. To address this, some PC pumps may include a split casing, e.g., a split stator casing or split suction casing, for accessing the stator and rotor without removing the pump. However, such split casing arrangements are disadvantageous as the multi-piece stator is more susceptible to leaks and can only handle lower maximum fluid pressures. Additionally, full disassembly may still be required for repair or maintenance of seals and joints.

In view of these and other problems, there is a need for a pump having an improved design for easier repair and maintenance, while maintaining a robust design for heavy and constant industry use. It is with respect to these and other considerations that the present improvements may be useful.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

According to embodiments of the present disclosure, a pump may comprise a housing having a first end and a second end and a longitudinal axis, and a discharge casing having a first end coupleable to the second end of the housing, the discharge casing extending along the longitudinal axis coaxial to the housing. The pump may further comprise a dismounting device including a first dismount casing and a second dismount casing disposed between the discharge casing and the second end of the housing. The dismounting device may be configured to extend along the longitudinal axis coaxial with the housing and the discharge casing. The first dismount casing may have a variable first thickness and the second dismount casing having a variable second thickness such that the first dismount casing is configured to mate with the second dismount casing so that the dismounting device has a cylindrical shape.

According to embodiments of the present disclosure, a pump may comprise a housing having a first end and a second end and a longitudinal axis, and a discharge casing having a first end coupleable to the second end of the housing, the discharge casing extending along the longitudinal axis coaxial to the housing. The pump may further comprise a dismounting device including a first dismount casing and a second dismount casing disposed between the discharge casing and the second end of the housing. The dismounting device may be configured to extend along the longitudinal axis coaxial with the housing and the discharge casing. The first dismount casing may have an outer diameter configured to at least partially contact an inner diameter of the second dismount casing.

According to exemplary embodiments of the present disclosure, a pump may comprise a housing having a first end and a second end and a longitudinal axis, and a discharge casing having a first end coupleable to the second end of the housing and a second end coupleable to a discharge conduit, the discharge casing and the discharge conduit extending along the longitudinal axis coaxial to the housing. The pump may further comprise a dismounting device including a dismount casing disposed between the discharge casing and the second end of the housing. The dismounting device may be configured to extend along the longitudinal axis coaxial with the housing, the discharge casing, and the discharge conduit. The dismount casing may extend over the second end of the housing and is removably coupleable to the discharge casing.

According to exemplary embodiments of the present disclosure, a pump may comprise a housing having a first end and a second end and a longitudinal axis. A discharge casing can have a first end coupleable to the second end of the housing, the discharge casing extending along the longitudinal axis coaxial to the housing. A dismounting device can include a first dismount casing and a second dismount casing disposed between the discharge casing and the second end of the housing, the dismounting device configured to extend along the longitudinal axis coaxial with the housing and the discharge casing. In some embodiments the first dismount casing has a variable first thickness and the second dismount casing has a variable second thickness such that the first dismount casing is configured to mate with the second dismount casing so that the first dismount casing has an outer diameter configured to at least partially contact an inner diameter of the second dismount casing.

In some embodiments, the first and second dismount casings are removably coupleable to the second end of the housing, such that an internal portion of the housing is accessible when the first and second dismount casings are decoupled from the second end of the housing. The first end of the housing can be coupleable to a suction casing by a tie rod extending to the second end of the housing. The tie rod can be connectable to a flange disposed at the second end of the housing, preferably with one of the following: the flange can be further coupleable to the discharge casing such that the first dismount casing and the second dismount casing are compressed between the discharge casing and the flange; the flange can be integral to the housing; and the flange can be coupleable to the second end of the housing.

In some embodiments, the first dismount casing has an inner tapered surface and the second dismount casing has a correspondingly inner tapered surface such that the inner tapered surfaces of the first and second dismount casings mate with each other, preferably wherein the first and second dismount casings are mated together to form a cylindrical element.

The housing can include a rotor and a stator. The discharge casing can include a second end coupleable to a discharge conduit. The pump further may comprise a drive shaft rotationally coupled to a rotor by a first coupling rod portion and a second coupling rod portion, preferably a bearing bracket is coupled to a suction casing, the drive shaft extending through the bearing bracket, wherein the bearing bracket forms a shaft seal housing and a removably attachable seal housing cover, more preferably the seal housing cover is removably attachable to the shaft seal housing for accessing a mechanical seal on the drive shaft, and/or the second coupling rod portion is connectable to the rotor by a pivot joint, the first coupling rod portion being removably attachable to the second coupling rod portion by one or more fasteners.

The first dismount casing can be removably coupleable to the second end of the housing, and second dismount casing can be removably coupleable to the discharge casing, such that an internal portion of the housing is accessible, preferably wherein the first dismount casing and the second dismount casing are selectively slideable relative to each other along the longitudinal axis.

The first end of the housing can be coupleable to a suction casing by a tie rod extending to the second end of the housing, the tie rod being connectable the first dismount casing. The first dismount casing can be coupleable to the second dismount casing by a fastener, and/or further comprising a drive shaft rotationally coupled to a rotor by a first coupling rod portion and a second coupling rod portion, preferably wherein a bearing bracket is coupled to a suction casing, the drive shaft extending through the bearing bracket, more preferably wherein the bearing bracket forms a shaft seal housing and a removably attachable seal housing cover. In some embodiments, the seal housing cover is removably attachable to the shaft seal housing for accessing a mechanical seal on the drive shaft.

BRIEF DESCRIPTION OF THE DRAWINGS

By way of example, a specific embodiment of the disclosed device will now be described, with reference to the accompanying drawings, in which.

DETAILED DESCRIPTION

Figure 1:
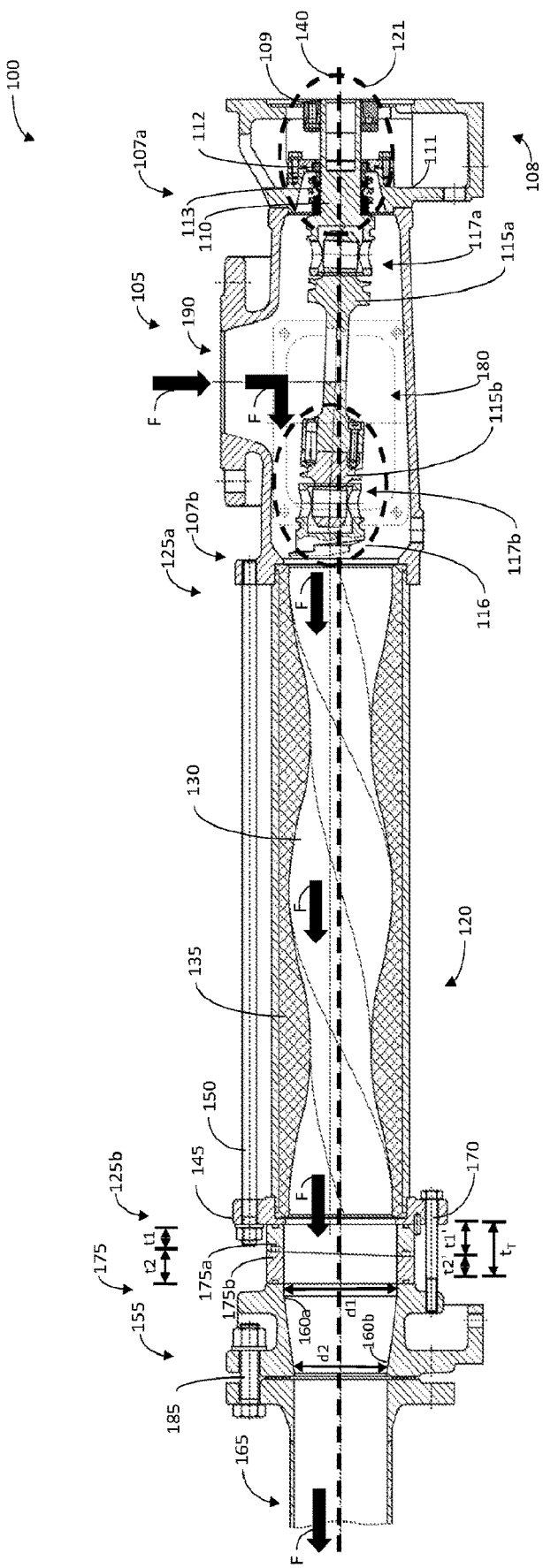
FIG. 1 is a sectional view illustrating an embodiment of a pump in accordance with the present disclosure in an assembled condition.

The present embodiments will now be described more fully hereinafter with reference to the accompanying drawings, in which several exemplary embodiments are shown. The subject matter of the present disclosure, however, may be embodied in many different forms and should not be construed as limited to the embodiments set forth herein. Rather, these embodiments are provided so that this disclosure will be thorough and complete, and willfully convey the scope of the subject matter to those skilled in the art. In the drawings, like numbers refer to like elements throughout.

The present disclosure relates to progressive cavity (PC) pumps having a robust design to allow for easier repair and maintenance, to reduce system downtime while still maintaining pump performance parameters. As mentioned, existing PC pumps may require significant disassembly for repair and maintenance in order to access internal pump components such as the rotor, stator, seals, and the like, and pumps that incorporate easier internal access sacrifices pump performance parameters, such as maximum fluid pressure and leakage. The presently disclosed arrangement provides for quick access to the internal pump components while still allowing the PC pump to remain substantially intact (e.g., substantial disassembly is not required) and maintaining a robust design. For example, a dismount casing may be configured for easy connection and removal to the pump to provide access to the desired components, while still maintaining structural integrity and seals for use in high pressure environments. Embodiments of the present disclosure thus reduces system downtime for maintenance and repair of the PC pump.

Referring now to FIG. 1, a sectional view of a pump 100 consistent with a non-limiting, exemplary embodiment of the present disclosure is shown. In some embodiments, pump 100 may be a progressive cavity (PC) pump 100, though aspects of the disclosure can be applied to other pump types without departing from the spirit of the disclosure. The pump 100 may be configured as a portion of a larger system for moving fluid, e.g., wastewater, and may have components (not shown) connected upstream and downstream for fluid movement. The pump 100 may include a suction casing 105 for housing a drive shaft 110, and a coupling rod having a first coupling rod portion 115a and a second coupling rod portion 115b. The first coupling rod portion 115a may be connected to the drive shaft 110 at a first joint 117a, and the second coupling rod portion 115b may be connected to a rotor 130 at a second joint 117b. The first and second joints 117a, 117b may be any known connection, including but not limited to a pivot joint or pivot connection. In one non-limiting example, the first and second joints 117a, 117b may allow the first and second coupling rod portions 115a, 115b to move with multiple degrees of freedom about the drive shaft 110 and rotor 130.

A two-part coupling rod, e.g., having first and second coupling rod portions 115a, 115b, may allow for easier maintenance and repair of the pump 100. For example, the rotor 130 may be removable without opening the second joint 117b and/or removing the drive shaft 110. The first coupling rod portion 115a may be removably attachable to the drive shaft 110 at the first joint 117a, and removably attachable to the second coupling rod portion 115b at the second joint 117b to the rotor 130, so that detaching the first and second coupling rod portions 115a, 115b may allow for easy removal and/or replacement of the rotor 130 and the second joint 117b. The rotor 130 and accompanying components may be removable after removal of a dismount device 175, described below.

Figure 1B:
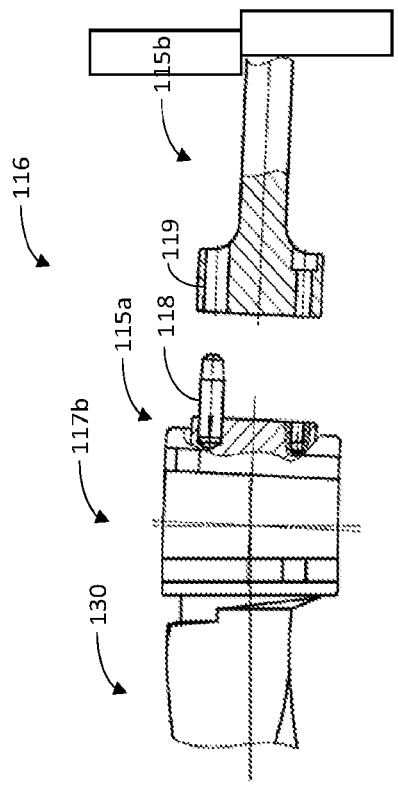
FIG. 1B is a detail sectional view of the pump of FIG. 1 illustrating an embodiment of a first and second coupling rod in a detached position.
Figure 1A:
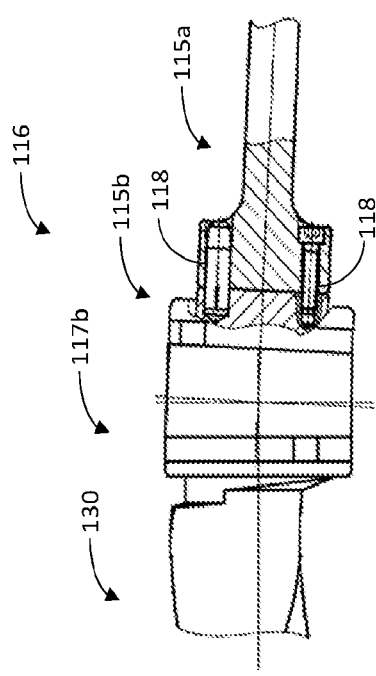
FIG. 1A is a detail sectional view of the pump of FIG. 1 illustrating an embodiment of a first and second coupling rod in an attached position.

As shown in FIGS. 1A and 1B, a detail view 116 of the rotor 130, the second joint 117b, and the first and second coupling rod portions 115a, 115b, are illustrated in an attached and detached position, respectively. In an attached position, the rotor 130 and the second coupling rod portion 115b at the second joint 117b may be coupled to the first coupling rod portion 115a. When the rotor 130 and the second joint 117b need to be removed for repair and/or replacement, the second coupling rod portion 115b may be detached from the first coupling rod portion 115a by undoing one or more fasteners 118, instead of opening the joint. In some embodiments, the one or more fasteners 118 may be any combination of screws, bolts, pins, or the like. For example, the fasteners 118 may include pins for transferring torque, and bolts for withstanding an axial load. In some embodiments, in the detached position, pins may remain in the second coupling rod portion 115b for quick reattachment of the repaired and/or replaced rotor 130 and second joint 117b, e.g., a tapered portion of the pins may aid in centering to a corresponding hole 119 in the first coupling rod portion 115a.

The suction casing 105 may be substantially hollow and may be formed to allow for fluid to flow from attached suction piping (not shown) into the pump 100. In some embodiments, the suction casing 105 may have at least one opening 180 that may allow for quick access for repair, maintenance and/or cleaning of the suction casing. In some embodiments, the suction casing 105 may include a second opening (not shown) disposed opposite the opening 180. It may be advantageous to include more than one opening 180 to the suction casing 105 for total access to the first and second coupling rod portions 115a, 115b, thereby allowing separation of the first and second coupling rod portions 115a, 115b and the first and second joints 117a, 117b from the drive shaft 110 and the rotor 130.

In some embodiments, the suction casing 105 may have a first end 107a coupled to a bearing bracket 108. The bearing bracket 108 may receive at least a portion of the drive shaft 110 and house a clamping device 109 disposed on the drive shaft 110 to transmit rotational motion from a motor (not shown) to the drive shaft. The bearing bracket 108 may include a shaft seal housing 111 for isolating a mechanical seal 113, and in some embodiments, the shaft seal housing 111 may be formed at least partially integrally with the bearing bracket 108. A separate seal housing cover 112 may be removably attachable to the shaft seal housing 111, and secured by a fastener, including but not limited to screws, bolts, and pins (see FIGS. 1C-1D).

Figure 1D:
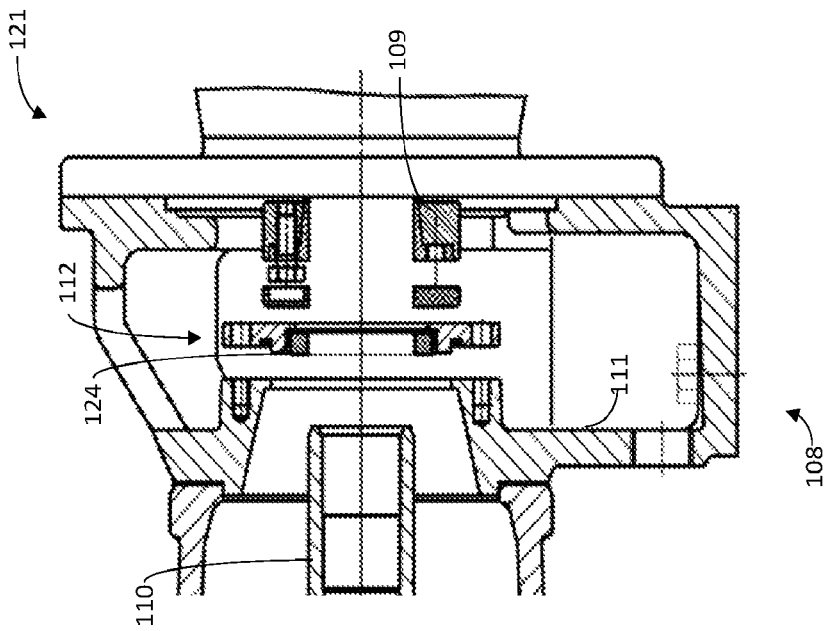
FIG. 1D is a detail sectional view of the pump of FIG. 1 illustrating an embodiment of the seal housing cover in a detached position.
Figure 1C:
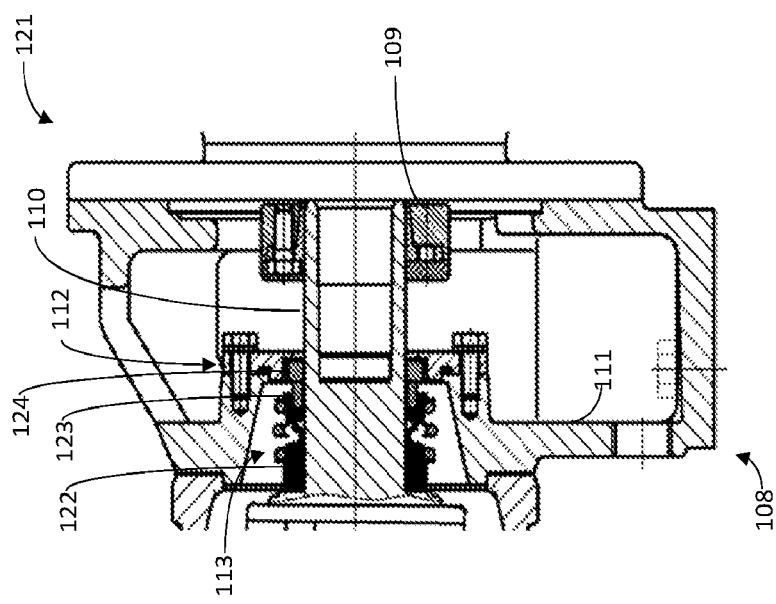
FIG. 1C is a detail sectional view of the pump of FIG. 1 illustrating an embodiment of a seal housing cover in an attached position.

The seal housing cover 112 may permit easy access to the mechanical seal 113 for maintenance and repair, e.g., to replace the mechanical seal 113. In this manner, the mechanical seal 113 may be replaceable with the drive shaft 110 and the first joint 117a, when disassembled from the rotor 130 and the stator 135. FIG. 1C illustrates a detail view 121 of the seal housing cover 112 in an attached position and FIG. 1D illustrates the seal housing cover 112 in a detached position. For example, after the rotor 130, stator 135, second joint 117b, and other components are removed, the clamping device 109 and the seal housing cover 112 may be unfastened and detached to access the first coupling rod portion 115a together with the first joint 117a, the drive shaft 110, and/or the mechanical seal 113 through the suction casing 105 along a longitudinal axis 140. As shown in FIG. 1D, when the seal housing cover 112 is detached from the shaft seal housing 111, the mechanical seal 113 may be accessed for removal and/or replacement. Disassembly of the first coupling rod portion 115a, the first joint 117a, and the drive shaft 110 may not be required, nor may removal of the suction casing 105, the bearing bracket 108, and/or motor from the remainder of the system (e.g., piping, installation and/or baseplate) be needed to change the mechanical seal 113. This may be advantageous to reduce downtime, and maintenance and repair costs. In some embodiments, an elastomer bellows 122 with a first counter ring 123 of the mechanical seal 113 may be located on the drive shaft 110 that may be easily removable when the seal housing cover 112 is removed, and a second counter ring 124 of the mechanical seal 113 may be located in the removable cover 112. When the seal housing cover 112 is attached to the shaft seal housing 111, the first counter ring 123 and the second counter ring 124 may be adjacent each other (see FIG. 1C).

A second end 107b of the suction casing 105 may be coupled to a first end 125a of a housing 120. The housing 120 may be formed as a hollow tube, and may be configured to receive the rotor 130 and a stator 135. The first and second coupling rod portions 115a, 115b may join the drive shaft 110 to the rotor 130 and may thereby transmit rotary motion from an external motor (not shown) to the rotor. In some embodiments, the rotor 130 may be a helical, or screw, shape and may be connected for off-center rotary motion by the first and second joints 117a, 117b. As mentioned, the first and second joints may be pivotally coupled to allow for several degrees of freedom of movement.to realize the eccentric rotation of the rotor 130.

The stator 135 may be formed along an interior surface of the housing 120, and in some embodiments, may be a vulcanized material. The housing 120 may be formed of a metal, plastic, or composite material, and in some embodiments may be formed of steel and/or cast iron. In some embodiments, the housing 120 and the stator 135 may be configured integrally, with an elastomer portion of the stator vulcanized into the housing 120. The housing 120 may include a contoured surface configured to mate with a contoured surface of the stator 135. The contoured surfaces may be any shape, including but not limited to including a curvature, hexagon, polygon, and oval. The housing 120 and stator 135 may be the main wear part of the pump 100, so that removal and replacement as regular maintenance may be necessary. Reference to the housing 120 throughout the description should be understood to include the stator 135.

In embodiments, the suction casing 105 may be formed of a metal, plastic, or composite material. In some embodiments, the suction casing 105 may be formed of a cast iron. The rotor 130 may be formed of a metal, plastic or composite, selected based on the particular fluid and industry to prolong the life of the rotor 130. In some embodiments, the rotor 130 may be coated.

The suction casing 105, the housing 120, and/or the stator 135, along with the drive shaft 110, bearing bracket 108, first and second coupling rod portions 115a, 115b, rotor 130, and stator 135, may be generally disposed along a longitudinal axis 140 of the pump 100 and may be generally coaxially oriented with respect to each other, so that fluid and matter may flow from the suction casing 105 through the rotor 130 and the stator 135 in the housing 120. As mentioned, the drive shaft 110 may receive a rotary motion input from a motor (not shown) and may transmit that rotary motion to the first and second coupling rod portions 115a, 115b to rotate the rotor 130 eccentrically with respect to the longitudinal axis 140 to advance the fluid flow through the pump 100.

The housing 120 may extend along the longitudinal axis 140 to a second end 125b. In some embodiments, a flange 145 may be coupleable to the second end 125b of the housing 120. The flange 145 may attach the suction casing 105 to the housing 120, e.g., by a tie rod 150. The tie rod 150 may be attachable to the suction casing 105 and the housing 120 by any fastening arrangement, including but not limited to a screw, nut, bolt, welding, soldering, brazing, adhesive, and interference fit. In embodiments, the tie rod 150 may be adjustable, e.g., tightened and loosened, at the flange 145 at the second end 125b of the housing 120 to access the internal pump components including the stator 135 and the rotor 130. Although the flange 145 is illustrated as an individual component, in some embodiments the flange 145 may be integral to the housing 120. The flange 145 may be formed of a metal, plastic, or composite, and in some embodiments, may be formed of cast iron.

A discharge casing 155 may be connectable to the second end 125b of the housing 120, to discharge fluid and matter flowing through the rotor 130 and the stator 135. In embodiments, the discharge casing 155 may have a first end 160a connectable, directly or indirectly, to the second end 125b of the housing 120, either directly or via the flange 145. The discharge casing 155 may extend along the longitudinal axis 140 coaxial to the housing 120 and the suction casing 105 to a second end 160b. The discharge casing 155 may be formed of a metal, plastic, or composite, and in some embodiments, may be formed of cast iron.

In embodiments, the discharge casing 155 may have an internal diameter, and in some embodiments, this internal diameter may be tapered. For example, the discharge casing may have a first diameter d1 at the first end that is larger than a second diameter d2. The first diameter d1 may be sized to the second end 125b of the housing 120, and the rotor 130, for flowing fluid and other matter through the pump 100. The second diameter d2 may be sized to components downstream of the pump for discharging the fluid. In some embodiments, the second end 160b of the discharge casing 155 may be coupleable to a discharge conduit 165. The discharge conduit 165 may be a pipe or other tubular configuration for connection to components downstream of the pump 100. The discharge conduit 165 may extend along the longitudinal axis 140 and may be coaxial with the discharge casing 155, the housing 120, and the suction casing 105. In embodiments, the discharge conduit 165 may be coupleable to the discharge casing 155 by a fastener 185, which may include at least one of a screw, a bolt, nut, pin, and the like. During use, the pump 100 may flow fluid and/or matter received in the suction casing 105 at an inlet 190 from upstream components (not shown). The drive shaft 110 may actuate the rotor 130 to flow fluid and/or matter through the housing 120, the discharge casing 155, and out the discharge conduit 165, as indicated by arrows "F" in FIG. 1.

In some embodiments, the flange 145 may be attachable to the discharge casing 155, e.g., by at least one connector 170. In embodiments, the connector 170 may be a screw, bolt, tie rod, pin, and the like, so that the at least one connector 170 may be removably attachable to the flange 145 and the discharge casing 155. In some embodiments, one or more seals may be disposed between the suction casing 105, the housing 120, the flange 145, and/or the discharge casing 155 to seal the components together to prevent leaks. The seals may be o-rings, flat gaskets, form-fit gaskets, and/or any combination thereof.

A dismounting device 175 may be disposed at the second end 125b of the housing 120. In some embodiments, the dismounting device 175 may be disposed between the flange 145 and the discharge casing 155, and may be configured to extend along the longitudinal axis 140 coaxial with the suction casing 105, the housing 120, and the discharge casing 155. As illustrated in FIG. 1, the dismounting device 175 may include a first dismount casing 175a and a second dismount casing 175b. The first and second dismount casings 175a, 175b may be formed as ring elements having respective central openings configured to enable fluid and other matter to flow through the first and second dismount casings 175a, 175b from the rotor 130 and the housing 120 to the discharge casing 155. The dismounting device 175 may be formed of a metal, plastic, or composite, and in some embodiments may be formed of cast iron.

The first dismount casing 175a and the second dismount casing 175b may be removably coupleable to the pump 100, and in some embodiments may be disposed between the second end 125b of the housing 120 and the discharge casing 155. For example, the at least one connector 170 between the flange 145 and the discharge casing 155 may secure the first dismount casing 175a and the second dismount casing 175b between the housing 120 and the discharge casing. In some embodiments, at least two connectors 170 may be used to maintain a consistent tension to seal the first and second dismount casings 175a, 175b. The first and second dismount casings 175a, 175b may have matching profiles, so that they mate with each other. In some embodiments, the first and second dismount casings 175a, 175b may each have a variable thickness such that they are not cylindrical in shape, but rather, each forms a tapered ring-shaped element. The tapered ring-shapes may be configured so that when the first and second dismount casings 175a, 175b are oriented in a desired manner and coupled together (i.e., to form the dismounting device 175), the dismounting device itself forms a cylindrical element that can be fit between the flange 145 and the discharge casing 155.

As can be seen in FIG. 1, the first and second dismount casings 175a, 175b may have respective variable first and second thicknesses. The variable first and second thicknesses may result in the dismount casings each having a tapered shape when viewed from the side (or above, depending upon their orientation). For example, as shown in FIG. 3A, the first dismount casing 175a can include first and second diametrically opposed portions 176a, 177a each having a respective thickness t1, t1'. Likewise, the second dismount casing 175b can include first and second diametrically opposed portions 176b, 177b, each having a respective thickness t2, t2'. The thickness t1 may be smaller than the thickness t1', while the thickness t2 may be greater than the thickness t2', which results each of the first and second dismount casings 175a, 175b having the aforementioned tapered profile. The tapers of the first and second dismount casings 175a, 175b can be complementary, so that when the casings are oriented in a desired manner (i.e., so that the respective first portions 176a, 176b engage each other and the respective second portions 177a, 177b engage each other) and are coupled together, the respective thicknesses t1+t2 (and t1'+t2') combine to obtain a constant total thickness $t_T$ of the dismounting device 175. That is, the tapered or conical profiles of the first and second dismount casings 175a, 175b combine to form the cylindrical dismounting device 175 that is sized to fit between the flange 145 and the discharge casing 155.

Figure 3B:
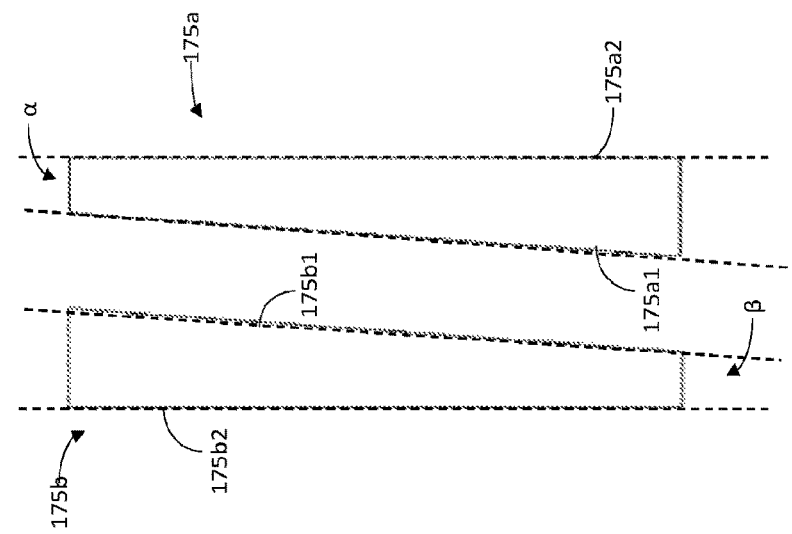
FIGS. 3A and 3B are perspective and side views, respectively illustrating an embodiment of a dismounting device of the pump shown in FIG. 1.
Figure 3A:
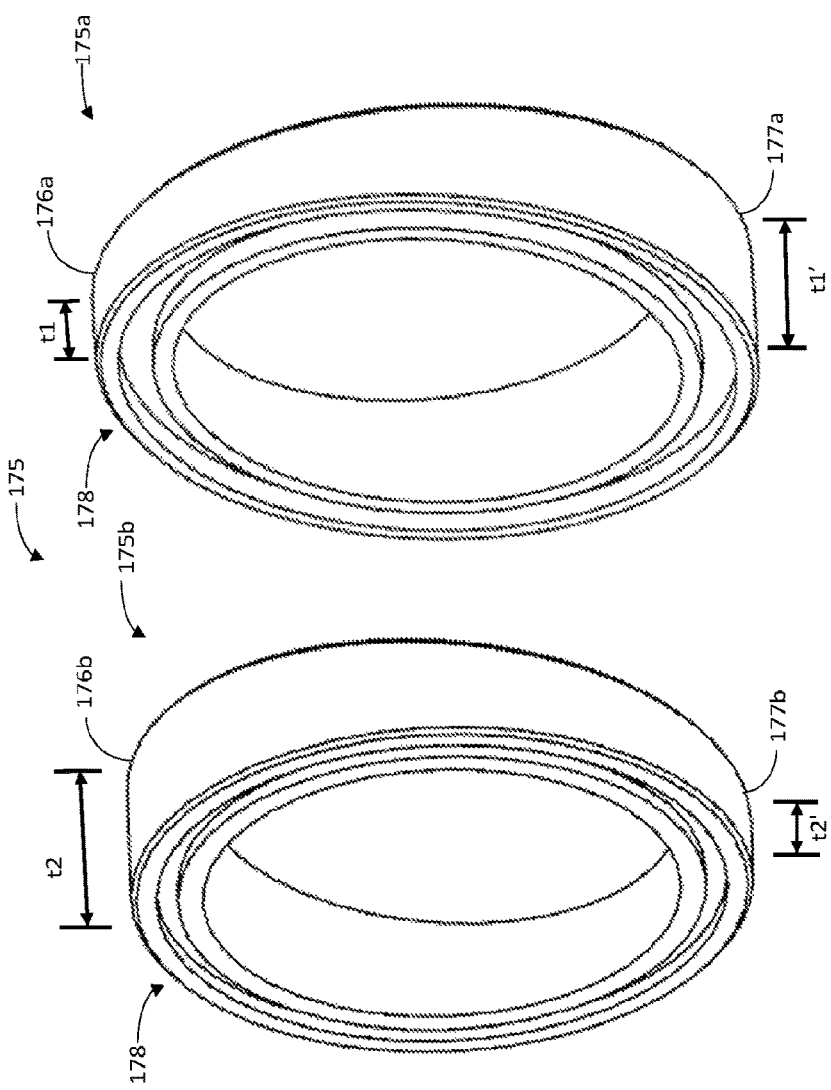

FIG. 3B shows the first and second dismount casings 175a, 175b each having a correspondingly inner tapered surface 175a1, 175b1 and an outer surface 175a2, 175b2. The inner tapered surfaces 175a1, 175b1 of the first and second dismount casings 175a, 175b may each form an oblique taper angle α, β with the respective outer surface 175a2, 175b2. In some embodiments, these oblique taper angles α, β are complementary so that when the first and second dismount casings 175a, 175b are fit together, the outer surfaces 175a2, 175b2 are parallel with each other. In some embodiments, the oblique taper angles α, β may be any range from 0.01° to 45°, and in particular may be between 1° and 10°. An oblique taper angle α, β may be determinable based on an outer diameter and a total thickness of the first and second dismount casings 175a, 175b. For example, the total thickness $t_T$ may be selected to be approximately 0.3 of the outer diameter of the first and second dismount casings 175a, 175b to provide a desired disassembly space, although this ratio may be more or less. In some embodiments a maximum angle α, β may be determined by calculating the inverse tangent function of the total thickness over the outer diameter, e.g., max α=arctan ($t_T$/outer diameter).

FIG. 3A shows that the thickness t1 of the first portion 176a (of the first dismount casing 175a) may be smaller than the thickness t2 of the second portion 176b (of the second dismount casing 175b), so that when the respective first portions 176a, 176b are mated together, the thicknesses t1+t1' can equal the total thickness $t_T$ (FIG. 1) of the dismounting device 175. Likewise, the thickness t1' of the second portion 177a (of the first dismount casing 175a) may be greater than the thickness t2' of the second portion 177b (of the second dismount casing 175b) so that when the respective second portions 177a, 177b are mated together, the thicknesses t2+t2' can equal the total thickness $t_T$ (FIG. 1) of the dismounting device 175. It will be appreciated that in some embodiments the first and second dismount casings 175a, 175b will be symmetrical such that thickness t1 will equal thickness t1' and that thickness t2 will equal thickness t2'. Alternatively, the first and second dismount casings 175a, 175b can be asymmetrical such that thickness t1 will be different from thickness t1' and that thickness t2 will be different from thickness t2' As mentioned, the disclosed variable thickness arrangement can result in each of the first and second dismount casings 175a, 175b forming a wedge, or taper, which can facilitate their easy removal during maintenance operations, as previously described. In some embodiments, the first and/or second dismount casings 175a, 175b may include grooves 178 on any of the inner tapered surfaces 175a1, 175b1 and/or the outer surfaces 175a2, 175b2 for receiving o-rings. O-rings may provide additional sealing between the first and second dismount casing 175a, 175b, the discharge casing 155, and/or the second end 125b of the housing 120.

A seal (or seals) may be provided in or on one or both of the inner tapered surfaces 175a1, 175b1 of the first and second dismount casings 175a, 175b to prevent pumped fluid from escaping between the casings. The seal can be any appropriate sealing element such as an elastomeric o-ring, gasket, or the like.

In order that the total thickness $t_T$ of the dismounting device 175 may remain constant, so that the dismounting device may appropriate fit to, and seal against, the flange 145 and discharge casing 155 (FIG. 1), respective outer surfaces 175a2, 175b2 of the first and second dismount casings 175a, 175b can be oriented substantially perpendicular to the longitudinal axis 140 (FIG. 1) of the pump 100 when the first and second dismount casings are coupled together. For example, outer surface 175a2 of the first dismount casing 175a may be square so as to fit with at least one of the second end 125b of the housing 120 or the flange 145. As mentioned, the inner tapered surface 175a1 may be smoothly tapering, from thickness t1 to thickness t1'. Similarly, an outer surface 175b2 of the second dismount casing 175b may be square so as to fit with the discharge casing 155. The inner surface 175b1 may be smoothly tapering, from thickness t2 to thickness t2'.

It may be advantageous for the first and second dismount casings 175a, 175b to have the aforementioned tapered geometries to facilitate an uncomplicated assembly and disassembly of the dismounting device 175. For example, with the disclosed arrangement the at least one connector 170 may only need to be slightly loosened for disassembly to allow for an operator to tap or knock the first and/or second dismount casing 175a, 175b to disengage them from the remainder of the pump and piping assembly. For example, the inner tapered surfaces 175a1, 175b1 may allow for easy removal of the first and second dismount casings 175a, 175b without interference by the discharge casing 155, the housing 120, and/or the flange 145. When the first and second dismount casings 175a, 175b are removed, the operator may then be able to access an internal portion of the housing, e.g., to access internal pump components, for repair and maintenance.

As will be appreciated, one or more appropriate sealing elements such as o-rings, gaskets or the like (not shown) may be disposed between adjacent facing surfaces of the first and second dismount casings 175a, 175b, and the adjacent discharge casing 155 and flange 145, to ensure leak-tight operation of the assembled components.

Figure 2:
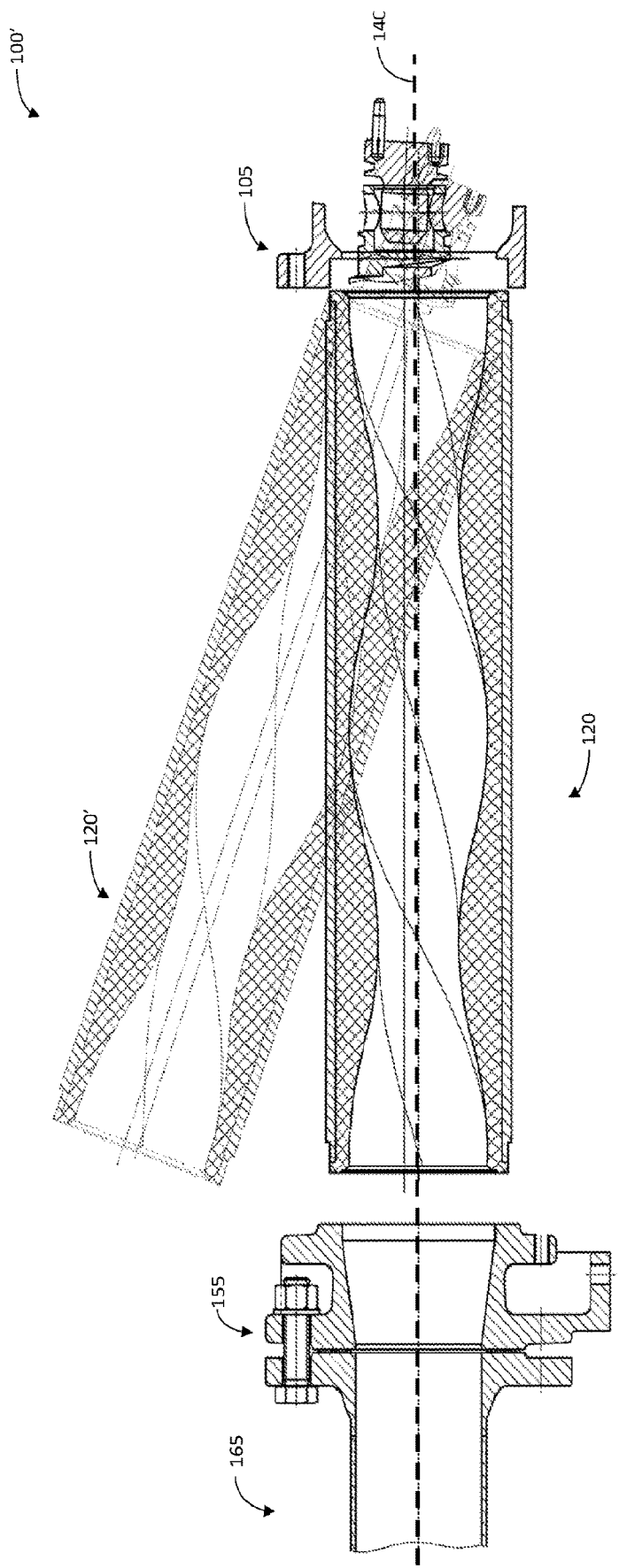
FIG. 2 is a sectional view illustrating an embodiment of the pump shown in FIG. 1 in a disassembled condition.

Referring now to FIG. 2, the pump 100' is illustrated in a disassembled condition in with the first and second dismount casings 175a, 175b removed. The at least one connector 170 may be unfastened to remove the first and second dismount casings 175a, 175b. That is, the tapered inner surfaces 175a1, 175b1 of the respective first and second dismount casings 175a, 175b may allow for quick removal. In some embodiments, an operator may access the first and second coupling rod portions 115a, 115b through the at least one opening 180 of the suction casing 105. The first and second coupling rod portions 115a, 115b may be loosened at the respective first and second joints 117a, 117b, thereby allowing repositioning and adjustment during disassembly. The tie rod 150 may also be removed, to separate the suction casing 105, the housing 120 (and the flange 145).

Removal of the first and second dismount casings 175a, 175b may allow for housing 120 to quickly become accessible, e.g., by repositioning to housing 120' (and stator 135), so that the rotor 130, stator 135, and other internal pump components are easily accessible to an operator for repair and maintenance. In the illustrated embodiment, the housing 120' can be rotated out of alignment with the system (i.e., out of alignment with longitudinal axis 140) by pivoting the housing and stator about the second coupling rod portion 115b. The housing 120', rotor and stator can then be easily disengaged from the suction casing 105 and second coupling rod portion 115b.

Such a disassembly scheme may provide an advantage over existing pumps at least for reasons previously stated. As will be appreciated, the discharge casing 155, the suction casing 105, and the bearing bracket 108 need not be removed and/or disassembled from the remainder of the system (e.g., piping, installation and/or baseplate) in order to access the housing 120' and internal components contained therein. This may save costs in time for repair and maintenance, reduce human error in reassembly, and reduce system downtime.

Figure 4:
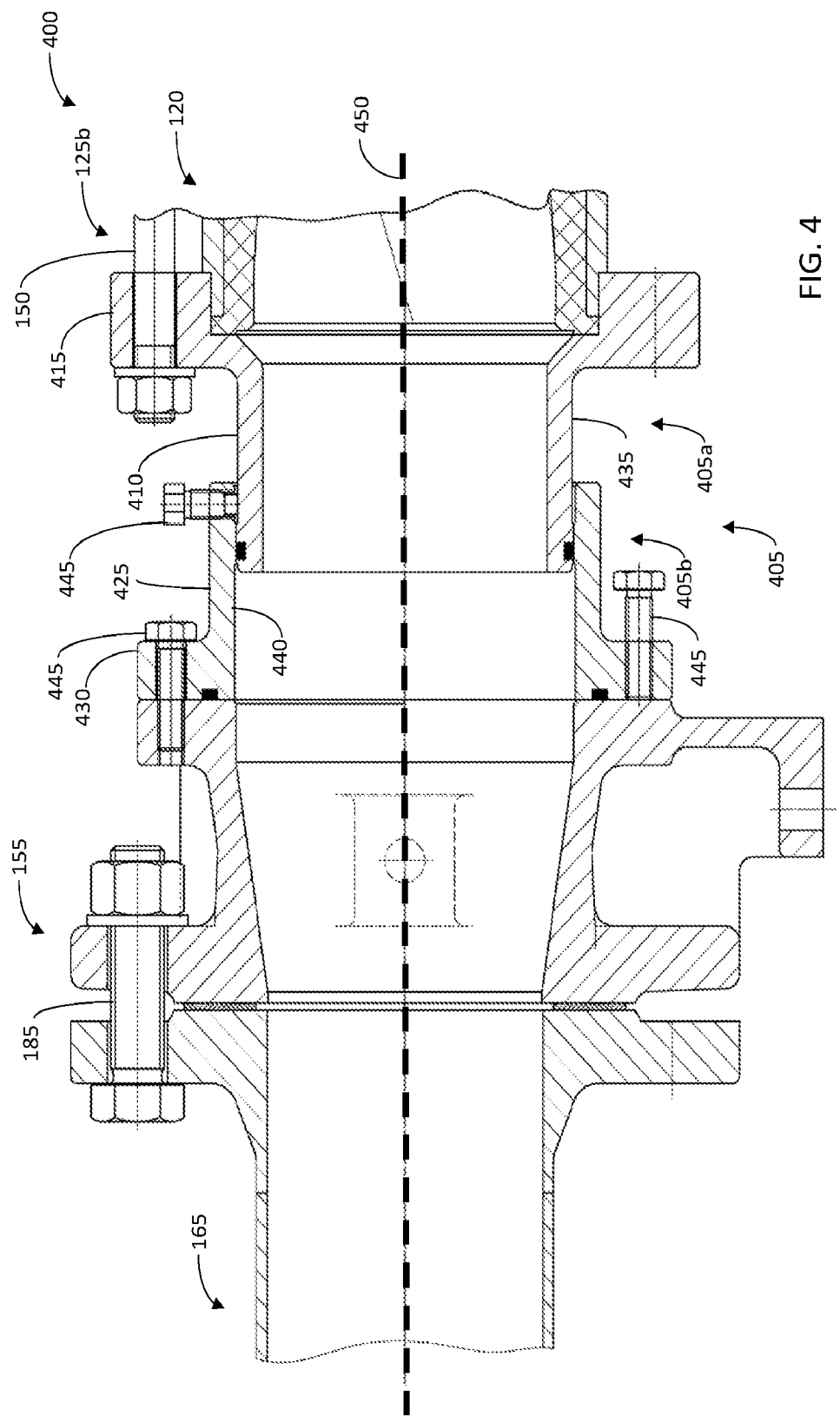
FIG. 4 is a partial sectional view illustrating another embodiment of dismount casings of a pump in accordance with the present disclosure.

Other embodiments of a dismount casing are also envisioned to enable quick removal and to provide easy access to the internal pump components. Referring now to FIG. 4, a partial sectional view of a pump 400 in accordance with another embodiment of the present disclosure is shown. Similar to the pump 100 of FIG. 1, a housing 120, a discharge casing 155, and a discharge conduit 165 may extend along a longitudinal axis 450 and may be coaxial with each other. A dismounting device 405 of the current embodiment may include a first dismount casing 405a and a second dismount casing 405b, extendable along the longitudinal axis 450 and coupleable between the second end 125b of the housing 120 and the discharge casing 155. The first dismount casing 405a may have a tubular portion 410 and a flange portion 415, while the second dismount casing 405b may have a tubular portion 425 and a flange portion 430. In embodiments, the flange portion 415 of the first dismount casing 405a may extend over at least a portion of the second end 125b of the housing 120, and may be coupleable to the housing 120 by the tie rod 150, which engages the suction casing 105 in the manner described in relation to the pump 100 of FIG. 1. The flange portion 430 of the second dismount casing 405b may be coupleable to the discharge casing 155, by any known fastening arrangement, including but not limited to screws, bolts, and pins. In the illustrated embodiment the flange portion 430 is coupled to the discharge casing 155 via one or more bolts.

In some embodiments, the tubular portion 410 of the first dismount casing 405a may be received within the tubular portion 425 of the second dismount casing 405b. For example, an outer diameter 435 of the tubular portion 410 of the first dismount casing 405a may be sized slightly smaller, e.g., a slip fit, than an inner diameter 440 of the tubular portion 425 of the second dismount casing 405b. For example, the outer diameter 435 of the tubular portion 410 of the first dismount casing 405a may at least partially contact the inner diameter 440 of the tubular portion 425 of the second dismount casing 405b. By sizing the tubular portions 410, 425 as such, the first and second dismount casings 405a, 405b may be telescoped in to each other to create an axial gap for a quick and easy removal of the dismount device 405 from the pump 400, to allow for repair and maintenance of the internal pump components. Similarly, for assembly, the first and second dismount casings 405a, 405b may telescope with respect to each other for mounting to the pump 400, and then extended outward until the flange portion 415 of the first dismount casing 405a is aligned with the second end 125b of the housing 120, and the flange portion 430 of the second dismount casing 405b is aligned with the discharge casing 155.

Appropriate seals, such as o-rings or other appropriate sealing elements, are disposed between the outer surface of the first dismount casing 405a and the inner surface of the second dismount casing 405b. Additional seals, such as o-rings or other appropriate sealing elements, can also be provided between mating faces of the second dismount casing 405b and the discharge casing 155.

A fastener 445, such as a screw, bolt, and/or pin, may be disposed through a radially-oriented opening in the second dismount casing 405b such that an end of the fastener may engage an outer surface of the first dismount casing 405a to secure the first dismount casing relative to the second dismount casing. Other fasteners can be used to secure the first dismount casing 405a and/or the second dismount casing 405b to the respective second end 125b of the housing 120 or the discharge casing 155. Appropriate bolt/nut combinations may be used for this purpose. Although FIG. 4 illustrates the tubular portion 410 of the first dismount casing 405a being smaller (e.g., to fit within) the tubular portion 425 of the second dismount casing 405b, it is understood that in other embodiments, the tubular portion 410 of the first dismount casing 405a may be larger than the tubular portion 425 of the second dismount casing 405b.

For repair and maintenance of pump 400, an operator may access the at least one opening 180 and loosen and/or remove the connection of the first and second coupling rod portions 115a, 115b. Similarly, the tie rod 150 and the fastener 445 may be loosened and/or removed. The first dismount casing 405a and the second dismount casing 405b may then be adjusted relative to each other, sliding the tubular portion 410 of the first dismount casing 405a within the tubular portion 425 of the second dismount casing 405b. This adjustment, e.g., by at least partially telescoping the first dismount casing 405a within the second dismount casing 405b, creates a sufficient clearance gap for easily removing the first and second dismount casings 405a, 405b from the pump 400. When the first and second dismount casings 405a, 405b have been removed, internal pump components (e.g., the rotor 130, stator 135, seals, and the like) may be easily repaired and/or replaced as necessary.

Figure 5:
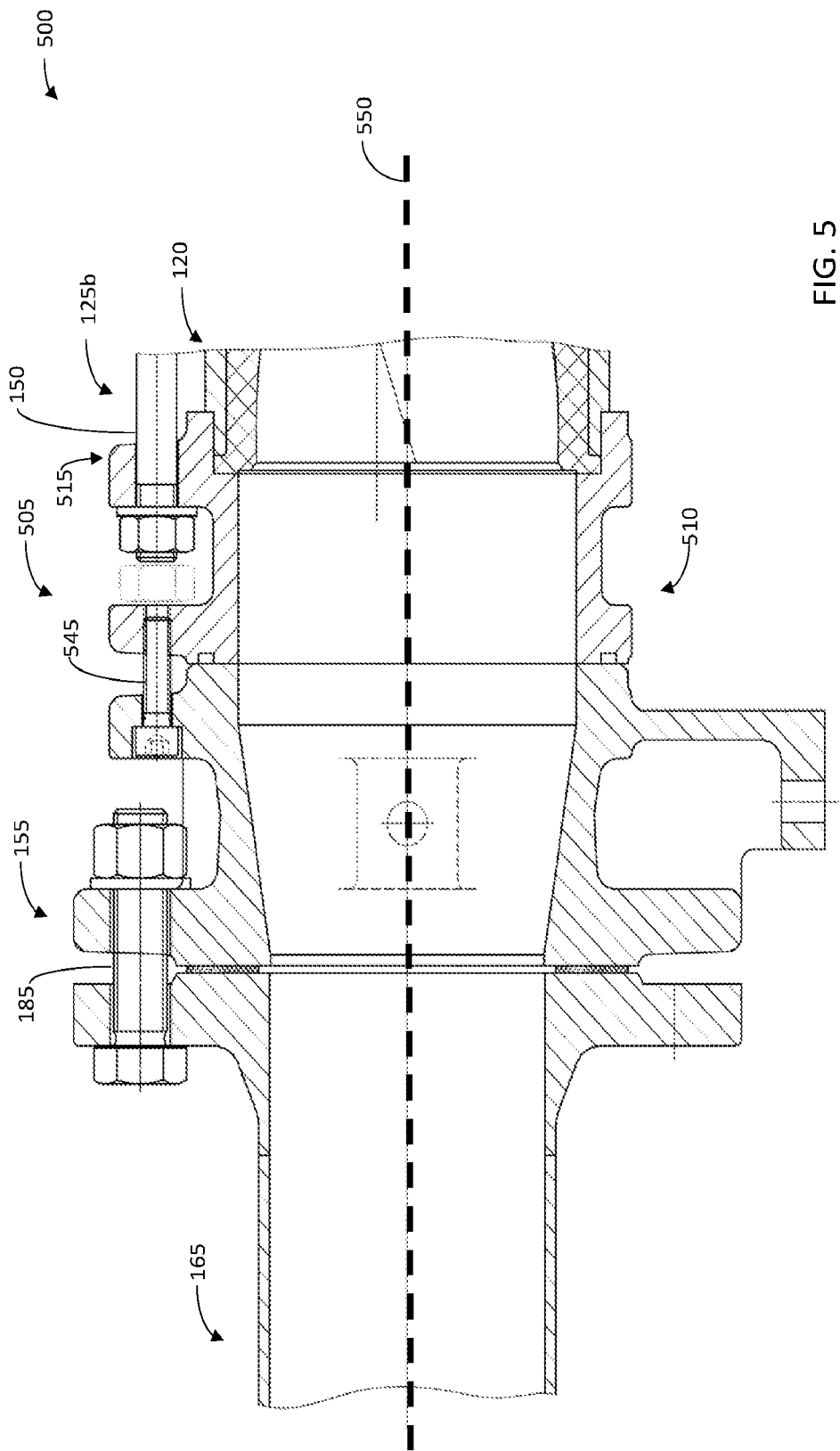
FIG. 5 is a partial sectional view illustrating another embodiment of a dismount casing of a pump in accordance with the present disclosure.

Referring now to FIG. 5, a partial sectional view of a pump 500 in accordance with another embodiment of the present disclosure is shown. Similar to the pump 100 of FIG. 1, a housing 120, a discharge casing 155, and a discharge conduit 165 may extend along a longitudinal axis 550 and may be coaxial to each other. A dismount casing 505 may be disposed between the second end 125b of the housing 120 and the discharge casing 155. The dismount casing 505 may have a tubular portion 510 and a flange portion 515. In embodiments, the flange portion 515 of the dismount casing 505 may extend over the second end 125b of the housing 120 for better sealing with the rotor 130 and stator 135, and may be coupleable to the housing 120 by the tie rod 150, which engages the suction casing 105 in the manner described in relation to the pump 100 of FIG. 1. One or more fasteners 545, such as a screw, bolt, and/or pin, may be disposed through a radially-oriented opening in the dismount casing 505 and a corresponding radially-oriented opening in the discharge casing 155 such that the fastener 545 may secure the dismount casing 505 to the discharge casing 155. Appropriate bolt/nut combinations may be used for this purpose.

For maintenance and repair of the pump 500, an operator may remove the fastener 185 to separate the discharge casing 155 and the discharge conduit 165, as well as any fasteners securing the discharge casing 155 from the remainder of the system (e.g., piping, installation and/or baseplate). Similarly, the tie rod 150 and the fasteners 445 may be loosened and/or removed to separate the discharge casing 155 and the dismount casing 505. Once the discharge casing 155 is removed, there is sufficient clearance for removal of the dismount casing 505. When the discharge casing 155 and the dismount casing 505 have been removed, internal pump components (e.g., the rotor 130, stator 135, seals, and the like) may be easily repaired and/or replaced as necessary.

As used herein, an element or operation recited in the singular and proceeded with the word "a" or "an" should be understood as not excluding plural elements or operations, unless such exclusion is explicitly recited. Furthermore, references to "one embodiment" of the present disclosure are not intended to be interpreted as excluding the existence of additional embodiments that also incorporate the recited features.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes.

Accordingly, the claims set forth below should be construed in view of the full breadth and spirit of the present disclosure as described herein.

The invention claimed is:

1. A pump, comprising:
   a housing having a first end and a second end and a longitudinal axis;
   a discharge casing having a first end coupleable to the second end of the housing by a dismounting device, the discharge casing extending along the longitudinal axis coaxial to the housing; and
   the dismounting device including a first dismount casing and a second dismount casing disposed between the discharge casing and the second end of the housing, the dismounting device configured to extend along the longitudinal axis coaxial with the housing and the discharge casing, the first dismount casing having a variable first thickness and the second dismount casing having a variable second thickness such that the first dismount casing is configured to mate with the second dismount casing so that the dismounting device has a cylindrical shape;
   wherein:
   the first dismount casing has a first inner tapered surface and a first outer surface to form a first oblique taper angle;
   the second dismount casing has a second inner tapered surface and a second outer surface to form a second oblique taper angle such that the first inner tapered surface mates with the second inner tapered surface; and
   the first oblique taper angle is complementary to the second oblique taper angle.

2. The pump according to claim 1, wherein the first dismount casing and the second dismount casing are removably coupleable to the second end of the housing and the discharge casing such that an internal portion of the housing is accessible.

3. The pump according to claim 1, wherein the first end of the housing is coupleable to a suction casing by a tie rod extending to the second end of the housing, the tie rod being connectable to a flange disposed at the second end of the housing.

4. The pump according to claim 3, wherein the flange is further coupleable to the discharge casing such that the first dismount casing and the second dismount casing are compressed between the discharge casing and the flange.

5. The pump according to claim 3, wherein the flange is integral to the housing.

6. The pump according to claim 3, wherein the flange is coupleable to the second end of the housing.

7. The pump according to claim 1, wherein the first dismount casing and the second dismount casing are mated together to form a cylindrical element.

8. The pump according to claim 1, wherein the housing includes a rotor and a stator.

9. The pump according to claim 1, wherein the discharge casing includes a second end coupleable to a discharge conduit.

10. The pump according to claim 1, further comprising a drive shaft rotationally coupled to a rotor by a first coupling rod portion and a second coupling rod portion.

11. The pump according to claim 10, wherein a bearing bracket is coupled to a suction casing, the drive shaft extending through the bearing bracket,
   wherein the bearing bracket forms a shaft seal housing and a removably attachable seal housing cover.

12. The pump according to claim 11, wherein the seal housing cover is removably attachable to the shaft seal housing for accessing a mechanical seal on the drive shaft.

13. The pump according to claim 10, wherein the second coupling rod portion is connectable to the rotor by a pivot joint, the first coupling rod portion being removably attachable to the second coupling rod portion by one or more fasteners.

* * * * *